REFRIGERATION PROCESS
Original Filed Aug. 19, 1964
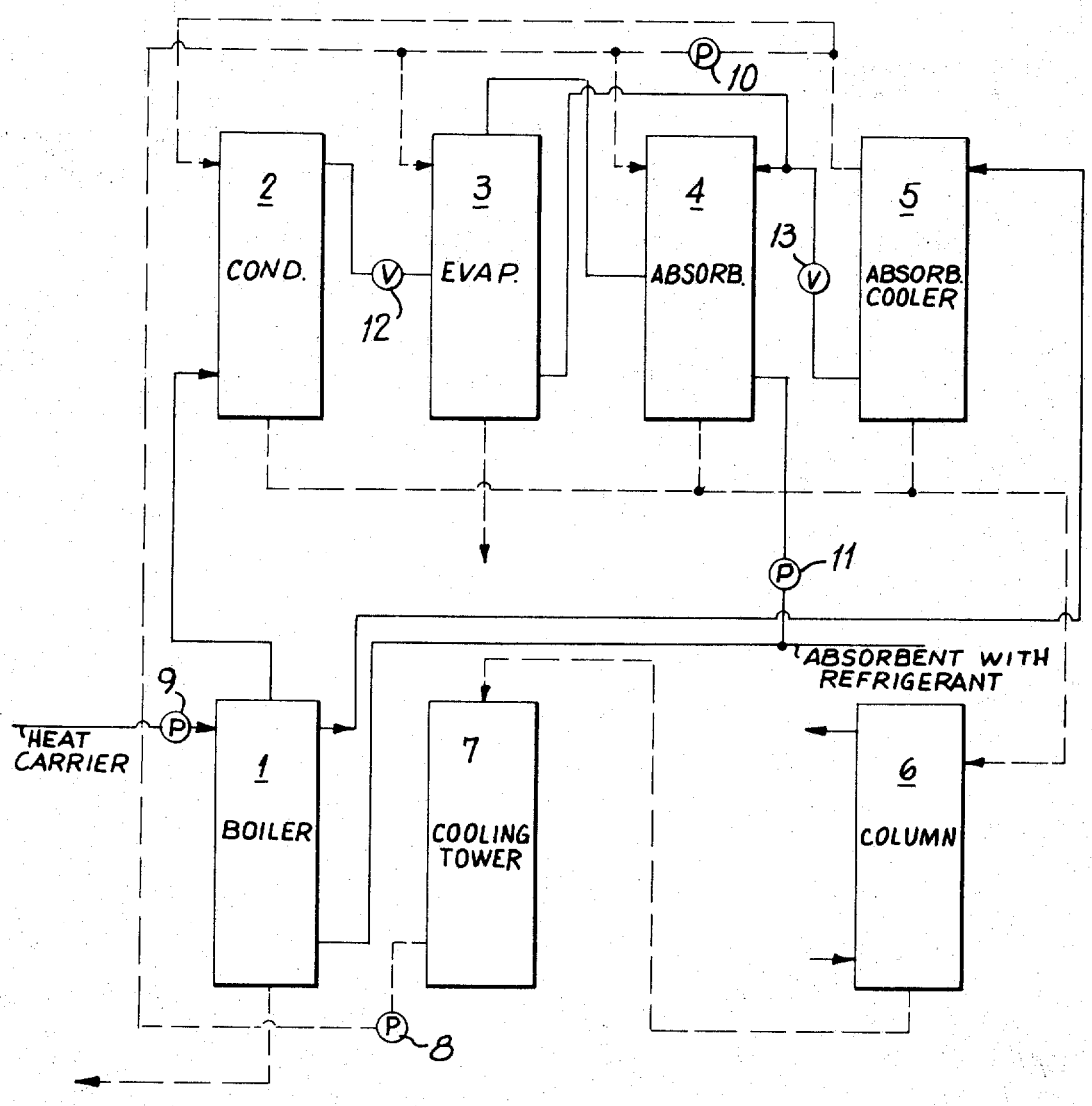

United States Patent Office

Re. 27,074
Reissued Feb. 23, 1971

27,074
REFRIGERATION PROCESS

Mikhail Emmanuilovich Aerov, Tatiana Alexandrovna Bystrova, Nina Ivanovna Zelentsova, and Vera Afanasjevna Kulikova, Moscow, U.S.S.R., by Nauchno-Issledovateljsky Institute Sinteticheskikh Spirtov i Organicheskikh Produktov, assignee, Moscow, U.S.S.R.

Original No. 3,312,078, dated Apr. 4, 1967, Ser. No. 390,672, Aug. 19, 1964. Application for reissue Aug. 20, 1969, Ser. No. 855,434

Int. Cl. F25b *15/04*

U.S. Cl. 62—112 7 Claims

Matter enclosed in heavy brackets [ ] appears in the original patent but forms no part of this reissue specification; matter printed in italics indicates the additions made by reissue.

*ABSTRACT OF THE DISCLOSURE*

*A refrigeration process comprises evaporating a refrigerant from an absorbent saturated with the refrigerant by direct contact with a heat carrier which is readily separable from the absorbent and refrigerant, thereafter condensing the vaporized refrigerant by heat exchange with a cold carrier, then evaporating the refrigerant condensate by heat exchange with a medium to be cooled which is readily separable from the refrigerant and then saturating the cooled absorbent with the refrigerant vapors and returning the saturated absorbent to the initial evaporation stage.*

*DESCRIPTION OF THE INVENTION*

The present invention relates to a refrigeration process for processing moderately low temperatures (+10 to −40° C.) in absorption cooling *plants.*

The known method of producing moderately low temperatures in absorption cooling plants is based on the use of ammonia and water. According to this method the heat exchange between the refrigerant, heat carrier and absorbent is performed through the walls of heat exchange apparatus, that is a boiler, condenser, evaporator, and absorbent cooler which have a large heat exchange surface. Since the difference of temperature of the refrigerant and heat carrier varies from 5 to 15° C., a heat carrier of a higher potential is required. Moreover, the use of a heat exchange device with a large heat exchange surface considerably increases expenses and does not permit the utilization of low potential waste heat as a heat carrier, e.g., the heat of hot water or low pressure steam.

An object of the present invention is to provide a cooling method in absorption cooling plants which enables the production of moderately low temperatures by the utilization of low potential waste heat, e.g. the heat of hot water or low pressure steam.

Another object of the invention is to provide a refrigeration method in which direct heat exchange contact is effected between the refrigerant, the heat carrier and the absorbent.

The above and other objects are attained in a refrigeration process in which an absorbent saturated with refrigerant is passed in direct heat exchange contact in a boiler with a heat carrier *while heat exchange between the heat exchanging media is carried out by direct contact.*

The absorbent is constituted by a liquid heavy paraffin hydrocarbon having 6 to 10 carbon atoms per molecule. The refrigerant is constituted by a light paraffin such as ethane, propane and butane. The heat carrier is constituted by waste water or low-pressure steam. In the process, the refrigerant is vaporized in the boiler and escapes from the boiler and passes into a con[denser, where it is condensed by contact with a] *denser, where it is condensed*

*by contact with a* cold carrier, e.g., water. The thus condensed refrigerant passes [into an evaporator, where it evaporates [in direct contact] *into an evaporator, where it evaporates in direct contact* with the medium to be cooled. The refrigerant vapors then pass into an absorber, where they saturate absorbent from the boiler which has been cooled. The thus saturated absorbent is then returned to the boiler to complete the process.

The described process may comprise one or more of the aforementioned stages *each stage including such steps as boiling, condensing, evaporating, absorbing and absorbent cooling steps.* All of said stages carry out direct contact between the heat exchanging media *at least in the above-mentioned stage of evaporation of the refrigerant in the boiler.* The medium to be cooled may be slightly soluble in the [afrementioned] *aforementioned* hydrocarbons, but must be readily separable therefrom. *The same is true of the cold carrier.* The medium to be cooled may for example, be water or an aqueous solution of calcium chloride (brine). The hydrocarbons which are dissolved in the cold carrier are removed by blowing through with a gas which may be slightly soluble in the cold carrier, e.g. a methane-hydrogen fraction.

The direct contact between the refrigerant, the absorbent, the heat carrier and cold carrier, enables maintaining temperature differences as low as 1° to 3° C., which permits the use of hot water as a heat carrier and the utilization of low pressure steam more effectively. Moreover, the direct contact permits the use of simple vessels instead of heat exchangers, thus reducing the expense and the power requirements of refrigeration.

The nature of the invention will appear more clearly from the appended flow diagram illustrating a contact type heat-exchange apparatus[:] *comprising* boiler 1, condenser 2, evaporator 3, absorber 4, absorbent cooler 5, column 6, cooling tower 7, low pressure pump 8, high pressure pumps 9, 10, and 11, and throttle valves 12 and 13.

According to the method of the invention, refrigeration is produced in the following way.

The absorbent saturated with refrigerant is delivered into the boiler 1 by the pump 11, the heat carrier (hot water or low pressure steam) is also delivered into the same boiled by the pump 9. In the boiler 1 the refrigerant is vaporized from the absorbent by the heat exchange with the *heat* carrier. *Heat exchange is effected by direct contact between the heat carrier, refrigerant and absorbent in boiler 1.* The refrigerant vapors escaping from the boiler 1 are condensed in condenser 2 by direct contact with the cooling water supplied from the cooling tower 7 by the pump 8. The refrigerant condensate formed in the condenser is throttled through the throttle valve 12 and is then directed either to the point where it is being consumed, or to the contact-type evaporator 3 where it evaporates in direct contact with the medium to be cooled, thus cooling the latter.

The heated absorbent flows from the boiler 1 to the absorbent cooler 5 where it is cooled by coming into direct contact with water delivered from the cooling tower 7. Then the cooled absorbent and the refrigerant vapors from evaporator 3 are supplied to the absorber 4, *the cooled absorbent having passed* through the throttle valve 13. The heat of absorption in the absorber 4 is removed by the cooling water in direct contact with the hydrocarbons. Then the saturated absorbent is transferred from the absorber 3 to the boiler 1 and the whole cycle is repeated.

When butane vapors are used for cooling water, hydrates may form; however, it has been found by experience that they do not clog the apparatus. Propane hydrates can be decomposed in the presence of electrolytic aqueous solutions which are supplied in this case as a

[refrigerant] *medium to be cooled* to the evaporator 3 with small amounts delivered at the same time to the throttle 12. The cooling water, leaving the condenser 2, absorber 4, and cooler 5, will contain small amounts of hydrocarbons. In order to avoid the objectionable odor of these hydrocarbons ($C_2$ and up), the water flowing from the condenser 2, absorber 4 and cooler 5 is blown through *with* the methane or methane hydrogen fraction in column 6.

For the production of brine having a temperature from [20] *−20* to −40° C. by the proposed method, a two-stage plant is used where a second stage of a condenser, an evaporator, an absorber and [a] *an absorbent* cooler are supplied with water or brine already cooled in a first stage. The invention will next be described in conjunction with the following specific examples.

EXAMPLE 1

This example is directed to the production of cold water with a temperature of +5° C. using the heat of hot water at a temperature of +90° C.

The refrigerant is butane. The high-boiling absorbent [component] is a mixture of paraffins which contains 7 to 8 carbon atoms per molecule. Pressure in the boiler is 4.5 kg./sq. cm., in the condenser 2—4.5 kg./sq. cm., in the evaporator 3 and absorber 4—1.3 kg./sq. cm., in the [coler] *cooler* 5—4.5 kg./sq. cm. The temperature of the water leaving the cooling tower 7 is +25° C., of the water supplied to the boiler 1 is +90° C., of the refrigerant condensate at throttle 12 is +4° C., of the water before entering column 6 is +30° C., and of the cooled water at the outlet of the apparatus is +5° C.

The minimum temperature differences are 1–2° C., condensation pressure is 4.5 kg./sq. cm., evaporation pressure is 1.3 kg./sq. cm. Butane concentration in mole percent is as follows: in the absorbent discharged from the boiler—35%, in saturated absorbent—50%, and in refrigerant—99%.

EXAMPLE 2

This example is directed to the production of brine at a temperature of −30° *C.* in the two-stage plant using the heat of hot water at a temperature of +90° C. The refrigerant is propane. *The absorbent corresponds to that in Example 1.* The assembly of elements 2, 3, 4 and 5 is supplied with brine having a temperature of +5° C., said brine having been obtained in a first stage by using butane as the refrigerant, according to Example 1.

In the second stage the condensation pressure is 6.5 kg./sq. cm., the evaporation pressure is 2 kg./sq. cm., propane [condensation] *concentration* in mole percent in absorbent discharged from the boiler in the second stage is 22%, in the saturated absorbent—34%, in the refrigerant—100%.

What is claimed is:

1. A method of effecting refrigeration in absorption cooling plants comprising evaporating a refrigerant from an absorbent saturated with said refrigerant by heat exchange with a heat carrier *which is readily separable from said absorbent and refrigerant,* said refrigerant being a light paraffin hydrocarbon, said absorbent being a liquid, heavy paraffin hydrocarbon, condensing the vaporized refrigerant by heat exchange with water as a cold carrier, evaporating the refrigerant condensate by heat exchange with a medium to be cooled which is readily separable from the refrigerant, saturating cooled absorbent with the refrigerant vapors and returning the saturated absorbent to the initial evaporation stage, the steps of the heat exchange between said absorbent, said heat carrier, said cold carrier, and *said* refrigerant being carried out by direct contact.

2. A method as claimed in claim 1, wherein said heat carrier is hot water.

3. A method as claimed in claim 2, wherein said heat carrier is low pressure steam.

4. A method as claimed in claim 1 comprising blowing *through* the water serving as a cold carrier [through] a gas which is not soluble in the cold carrier to remove any dissolved hydrocarbons.

5. A method of effecting refrigeration in an absorption cooling plant comprising evaporating a refrigerant from an absorbent saturated with said refrigerant by heat exchange with a heat carrier *which is readily separable from said absorbent and refrigerant,* said refrigerant being a light paraffin hydrocarbon the absorbent being a liquid, heavy paraffin hydrocarbon; condensing the vaporized refrigerant by heat exchange with cooling water constituting a cold carrier, evaporating the refrigerant condensate by heat exchange with the medium to be cooled; cooling the absorbent after the heat exchange with the heat carrier; saturating the thus cooled absorbent with vaporized refrigerant produced after contact with the medium to be cooled and recirculating the thus saturated absorbent to the initial stage of evaporation whereby a continuous process is obtained, said steps of heat exchange between said absorbent, said heat carrier, said cold carrier and said refrigerant being carried out by direct contact at least at the above-mentioned initial stage of evaporation.

6. A method as claimed in claim 5, wherein said heat carrier is hot water.

7. A method as claimed in claim 5, wherein said heat carrier is low pressure steam.

References Cited

The following references, cited by the Examiner, are of record in the patented file of this patent or the original patent.

UNITED STATES PATENTS

| | | | |
|---|---|---|---|
| 2,041,741 | 5/1936 | Bichowsky | 62—112 |
| 2,045,204 | 6/1936 | Shagoloff | 62—102 |
| 2,290,506 | 7/1942 | Thomas | 62—102 |
| 2,667,764 | 2/1954 | Turner | 62—101 |

WILLIAM E. WAYNER, Primary Examiner